US008887824B1

(12) United States Patent
Johnson et al.

(10) Patent No.: US 8,887,824 B1
(45) Date of Patent: Nov. 18, 2014

(54) TILLER FOR RESIDUE CROP PREPARATION

(71) Applicant: Myron Quinton Johnson, Headland, AL (US)

(72) Inventors: Myron Quinton Johnson, Headland, AL (US); John W. Sanders, Jr., Vienna, GA (US)

(73) Assignee: Myron Quinton Johnson, Headland, AL (US)

( * ) Notice: Subject to any disclaimer, the term of this patent is extended or adjusted under 35 U.S.C. 154(b) by 0 days.

(21) Appl. No.: 13/679,388

(22) Filed: Nov. 16, 2012

Related U.S. Application Data

(60) Provisional application No. 61/560,806, filed on Nov. 17, 2011.

(51) Int. Cl.
 *A01B 49/02* (2006.01)
(52) U.S. Cl.
 CPC .................................. *A01B 49/027* (2013.01)
 USPC ........... 172/177; 172/175; 172/176; 172/146; 172/166
(58) Field of Classification Search
 CPC .......... A01C 5/00; A01C 5/064; A01C 5/062; A01C 5/066; A01C 5/068; A01B 35/18; A01B 49/02; A01B 17/00; A01B 17/004; A01B 27/00; A01B 29/045; A01B 35/16
 USPC ......... 172/145–151, 174–177, 180, 181, 195, 172/196; 111/140, 164, 167
 See application file for complete search history.

(56) References Cited

U.S. PATENT DOCUMENTS

| | | | |
|---|---|---|---|
| 1,622,968 A | | 3/1927 | Orthman |
| 2,098,738 A | | 5/1937 | Campbell |
| 2,221,550 A | | 11/1940 | Lindgren |
| 2,325,997 A | | 9/1941 | Kelly |
| 2,269,724 A | * | 1/1942 | Linkogel ...................... 172/150 |
| 3,233,686 A | | 2/1966 | Steadman |
| 3,392,791 A | | 7/1968 | Orthman |
| 3,613,797 A | | 10/1971 | Whitfield |
| 3,766,988 A | | 10/1973 | Whitesides |
| 4,102,406 A | | 7/1978 | Orthman |
| 4,231,433 A | | 11/1980 | Whitfield |
| 4,298,071 A | | 11/1981 | Whitfield |
| 4,453,601 A | | 6/1984 | Orthman |

(Continued)

OTHER PUBLICATIONS

One Trip Plow Parts List KBH Corporation (Licensee of U.S. Pat. No. 8235132 to Condrey); published on May 19, 2008.

(Continued)

*Primary Examiner* — Matthew D Troutman
(74) *Attorney, Agent, or Firm* — The Gache Law Firm, P.C.; Russell C. Gache

(57) ABSTRACT

A tilling cultivator and associated method is disclosed for strip tilling cover crop in preparation for primary crop planting. The tiller includes a pressing drum having a band coulter for cutting surface and subsurface cover crop residue roots and compressing the cover crop into the soil. A trailing shank just behind and aligned with the coulter clears debris from the planting furrow, and a pair of staggered wavy coulters behind the shank closes any shank voids. A rolling basket or other optional soil conditioners trail behind the planting furrow to create a suitable seedbed for primary crop planting. The apparatus and an associated method of use aids in cover crop decomposition and pre-plant field preparation.

30 Claims, 14 Drawing Sheets

(56) References Cited

U.S. PATENT DOCUMENTS

| | | | |
|---|---|---|---|
| 4,492,272 A | 1/1985 | Jensen | |
| 4,762,181 A * | 8/1988 | Cox | 172/196 |
| 4,865,132 A * | 9/1989 | Moore Jr. | 172/196 |
| 5,062,488 A | 11/1991 | Lochmiller | |
| 5,333,694 A * | 8/1994 | Roggenbuck et al. | 172/156 |
| 5,390,745 A * | 2/1995 | Harden | 172/175 |
| 5,623,997 A * | 4/1997 | Rawson et al. | 172/156 |
| 5,782,309 A | 7/1998 | Bultman | |
| 6,431,287 B1 | 8/2002 | Ramp | |
| 6,681,868 B2 * | 1/2004 | Kovach et al. | 172/701 |
| 6,692,351 B2 | 2/2004 | Johnson | |
| 6,761,120 B2 * | 7/2004 | Kovach et al. | 111/140 |
| 6,928,941 B1 | 8/2005 | Sternltzke | |
| 7,594,546 B2 * | 9/2009 | Ankenman | 172/540 |
| 8,235,132 B2 | 8/2012 | Condrew | |
| 2003/0178209 A1 * | 9/2003 | Knobloch et al. | 172/145 |
| 2004/0144550 A1 * | 7/2004 | Hurtis | 172/147 |
| 2005/0016424 A1 | 1/2005 | Ellington | |
| 2007/0089888 A1 | 4/2007 | Condrey | |

OTHER PUBLICATIONS

Orthman Data Sheet (1tRIPr) 4 pages; publication date is unknown, but presumed to be before Nov. 17, 2011.

Orthman Data Sheet (8315 Cultivator) 1 page; publication date is unknown, but presumed to be before Nov. 17, 2011.

Orthman Data Sheet (8350 Cultivator) 1 page; publication date is unknown, but presumed to be before Nov. 17, 2011.

Orthman Data Sheet (8375 Cultivator) 1 page; publication date is unknown, but presumed to be before Nov. 17, 2011.

Orthman Data Sheet (Cultivator Accessories) 1 page; publication date is unknown, but presumed to be before Nov. 17, 2011.

Orthman Data Sheet (Stalk Puller) 1 page; publication date is unknown, but presumed to be before Nov. 17, 2011.

Orthman Data Sheet (Toolbar Accessories) 2 pages; publication date is unknown, but presumed to be before Nov. 17, 2011.

KMC Rip Strip Generation 1 Data Sheet (2 pages); publication date is unknown, but presumed to be before Nov. 17, 2011.

KMC Rip Strip Generation 2 Data Sheet (4 pages); publication date is unknown, but presumed to be before Nov. 17, 2011.

* cited by examiner

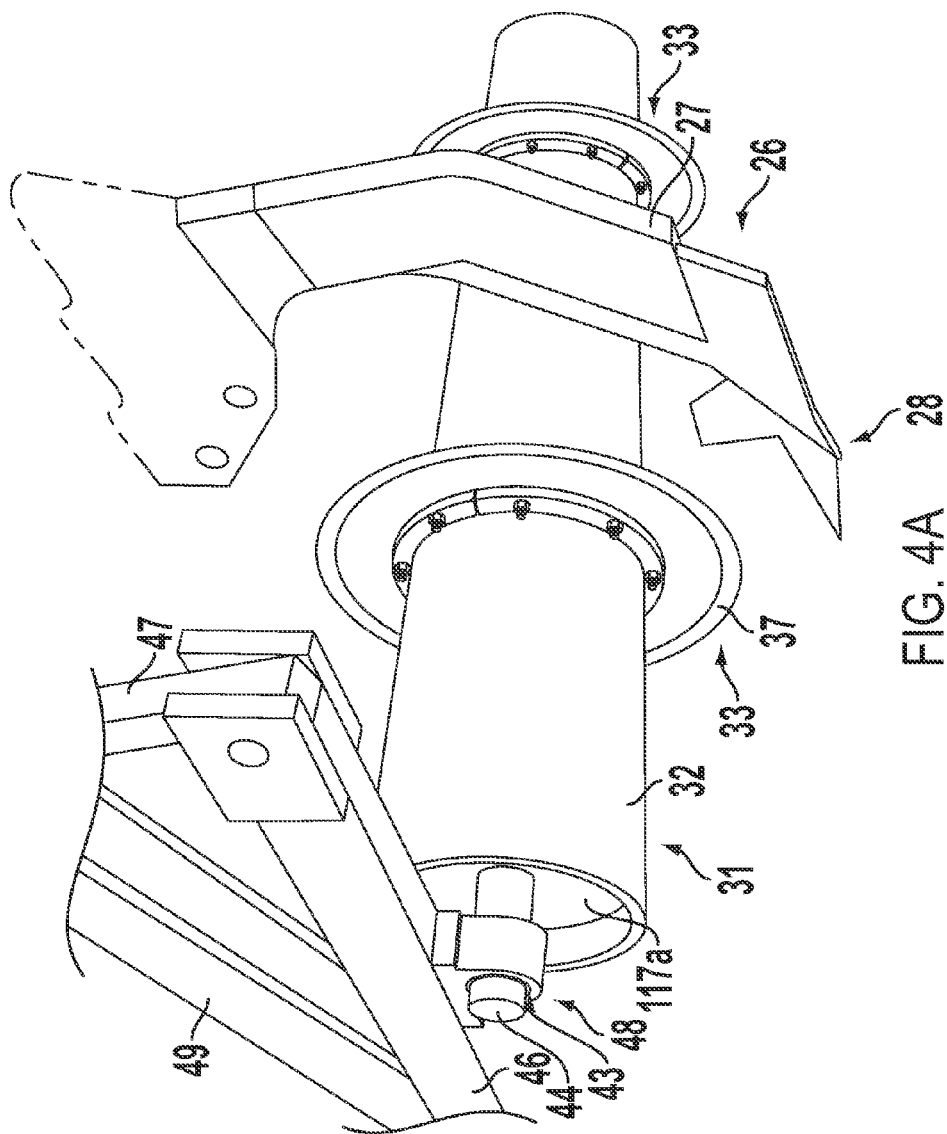

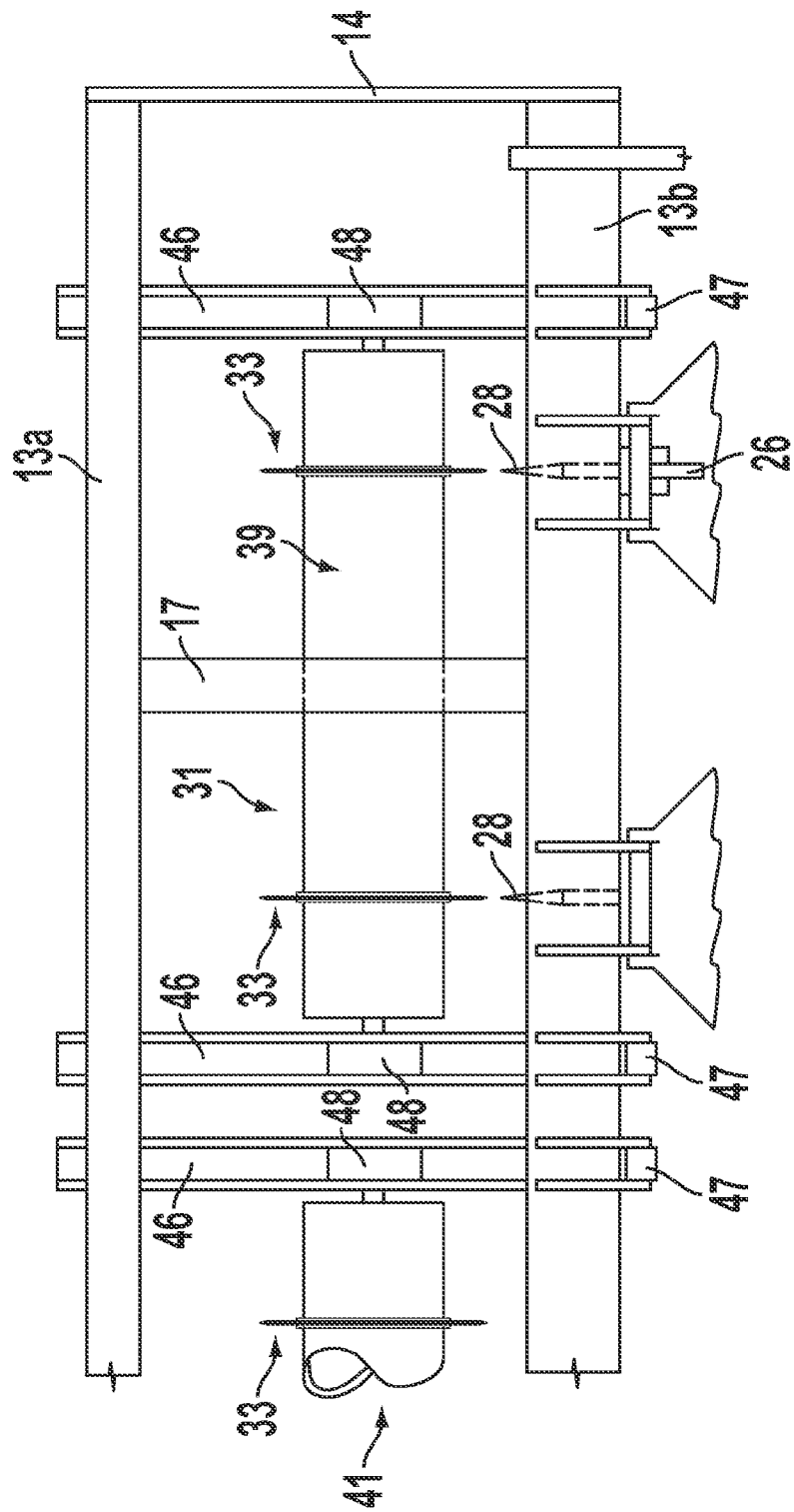

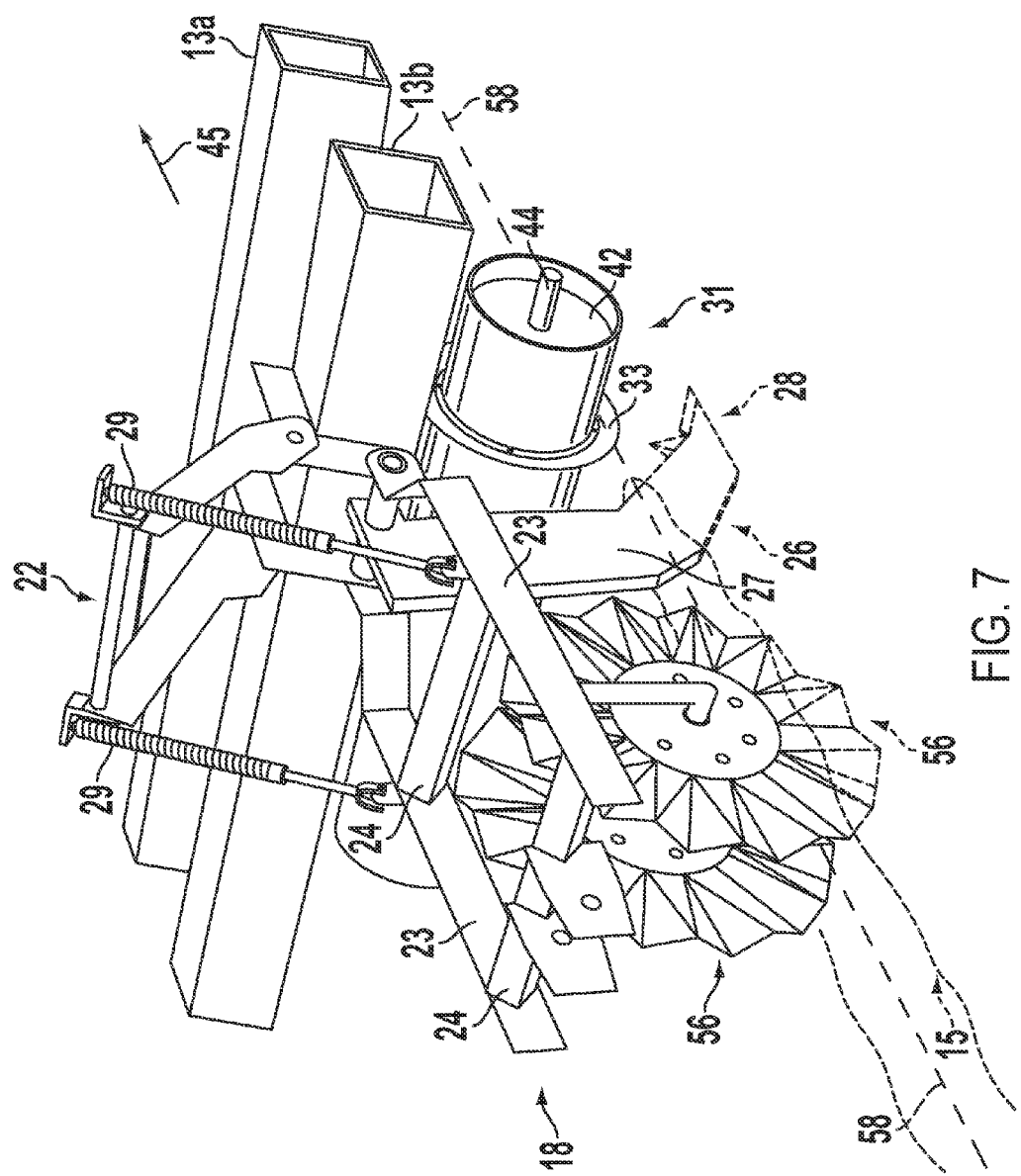

TILLER FOR RESIDUE CROP PREPARATION

This application claims the benefit of filing priority under 35 U.S.C. §119 and 37 C.F.R. §1.78 of the U.S. Provisional Application Ser. No. 61/560,806 filed Nov. 17, 2011, for a PRE-PLANT STRIP TILLER FOR USE WITH COVER CROPS. All information disclosed in that prior provisional application is incorporated herein by reference

FIELD OF THE INVENTION

The present invention relates generally to tillage farming implements trailed behind farm tractors such as field cultivators. In particular, the present invention relates to crop tillers having pressure rollers. In greater particularity, the present invention relates to tillers and cultivators that prepare crop fields having residue or cover crops planted therein just before spring planting.

BACKGROUND OF THE INVENTION

Reduced tillage strategies are popular in farming. Reduced tillage techniques include no tilling, strip tilling, mulch tilling, rotational tilling, and ridge tilling. Of these tillage techniques, strip tilling often referred to as "strip-till" is a conservation system that uses a minimum of tillage by focusing tillage actions on the intended seed bed or seed furrow while leaving the surrounding areas relatively undisturbed. Strip tilling combines the soil drying and warming benefits of conventional tillage with the soil-protecting advantages of no tilling at all by disturbing only the seed row portion of the soil. Another benefit of strip tilling is that a farmer can apply chemicals and fertilizer at the same time as tillage.

Some of the more immediate benefits of strip tilling include the field-wide preservation of soil colloids, soil pores, and root channels from previous crops, and strip tilling also preserve crop residue which aids in the buildup of soil organic matter. Additionally, the presence of large pores in the soil increases water percolation and improves crop rooting. Long-term research studies have shown that utilization of strip tilling and strategic fertilizer placement improves yield potential, including the preservation of water, soil, and improved plant health. Soils that were managed under strip tilling conditions generally have more beneficial worms per square foot, more frequent and larger soil pores per square inch, greater percent organic matter, faster water infiltration rates, and greater crop yields compared to soils that were managed under conventional-tillage. That is most likely the reason that strip tilling acreage in the Great Plains has greatly increased since the year 2000.

Strip tilling also has many economic benefits. Strip tillage reduces the amount of trips through a field to two or possibly even one when using a strip till implement combined with a planter. This can save the farmer a considerable amount of time and fuel, and it reduces soil compaction due to the press weight of tractors in a field. With the use of GPS guided tractors, precision farming can increase overall yields even more.

Strip tilling is also used effectively in the preparation of a field for planting in which cover crops have been planted. Cover crops are planted primarily to manage soil fertility, soil quality, water, weeds, pests, diseases, biodiversity and wildlife in agro-ecosystems, ecological systems managed and largely shaped by humans across a range of intensities to produce food, feed, or fiber. However, two primary uses of cover crops are emerging in the U.S. to augment farming strategies. First, cover crops are often used as an alternative to herbicide weed controls; and second cover crops are used for conservation, such as water and soil conservation.

In reduced tillage strategies, weed suppression can be problematic, and expensive. Fields left uncultivated tend to breed weeds and especially those weeds that have become resistance to herbicidal management which tend to proliferate in farming communities. Hence, reduced tilling may cause an increase in total farm expenses because herbicides are used in place of cultivation for weed suppression.

For example, weeds such as Morningglory, Pigweed (including Palmer amaranth), Lambsquarters, Marestail, Waterhemp, Giant and common ragweed, Velvetleaf, Eastern Black Nightshade, and Kochia are a prevalent and increasing problem in different parts of the country. Palmer amaranth (aka "Pigweed"—*Amaranthus palmeri*) is particularly relevant to the Southeast where it is a recurring problem for farmers there. Most of these varieties are becoming herbicide resistant, and farmers are seeking alternatives to herbicides to combat the invasion of these weeds. Therefore, farmers using reduced tillage methods are always looking for ways to combat the weed proliferation problem.

One alternative to herbicides is to use cover crops to cover the ground and crowd out weeds between primary crop growing seasons. A thick cover crop will compete well with weeds during the cover crop growth period, and can prevent most germinated weed seeds from completing their life cycle and reproducing. If the cover crop is left on the soil surface rather than incorporated into the soil as a green manure after its growth is terminated, it can form a nearly impenetrable mat. This drastically reduces light transmittance to weed seeds, which in many cases reduces weed seed germination rates. Furthermore, even when weed seeds germinate, they often run out of stored energy for growth before building the necessary structural capacity to break through the cover crop mulch layer, thereby smothering the weed seeds before maturing into a reproducing plant. Hence, cover crops are becoming a viable alternative to the use of ever increasing quantities of herbicides.

By reducing soil erosion, cover crops often also reduce both the rate and quantity of water that drains off the field, which would normally pose environmental risks to waterways and ecosystems downstream. Cover crop biomass acts as a physical barrier between rainfall and the soil surface, allowing raindrops to steadily trickle down through the soil profile. Also, as stated above, cover crop root growth results in the formation of soil pores, which in addition to enhancing soil macro-fauna habitat, and provides pathways for water to filter through the soil profile rather than draining off the field as surface flow. With increased water infiltration, the potential for soil water storage and the recharging of aquifers can be improved, as well as generally increasing the soil moisture content.

Cover crops also can conserve water in another manner. Just before cover crops are killed, such as by mowing, tilling, disc mulching, rolling, or a herbicide application, the cover crop plants contain large amounts of moisture. When the cover crop is incorporated into the soil, or left on the soil surface, it increases soil moisture. In addition, in agro-ecosystems where water for crop production is in short supply, cover crops can be used as a mulch to conserve water by shading and cooling the soil surface, thereby reducing the evaporation of soil moisture.

Although cover crops can perform multiple functions in an agro-ecosystem simultaneously, they are often grown for the sole purpose of preventing soil erosion. Soil erosion is a process that can irreparably reduce the productive capacity of an agro-ecosystem. However, dense cover crop stands physically slow down the velocity of rainfall before it contacts the soil surface, preventing soil splashing and erosive surface runoff, and cover crop root networks help anchor the soil in place and increase soil porosity, creating suitable habitat networks for soil macro-fauna.

However, while the use of cover crops in combination with strip tilling have significant advantages to increase crop yields and over-all economic advantages, cover crops must be tilled to some degree prior to primary crop planting. The use of strip tilling with cover crops is the optimal strategy, but using an optimal strip tilling procedure can be elusive, due to the dense foliage of cover crops and due to the strong network of roots developed by cover crops. This can require a farmer to make multiple tilling passes over a cover crop field to properly prepare the field for planting, thereby costing the farmer more in gas, time, and labor, and defeating the very purpose of strip tilling.

Therefore, what is needed is a farming implement to allow for the efficient preparation of a farm field having a cover crop just prior to primary crop planting process, while creating a superior seedbed.

SUMMARY OF THE INVENTION

The invention consists of a tilling apparatus and associated method suitable for tilling a cover crop field in a single pass, including providing a consistent planting row depth and creating a proper seedbed. The invention includes a series of band coulters surrounding a roller or press drum that cuts surface and subsurface cover crop residue and compresses the cover crop residue into the soil. A trailing shank just behind and aligned with the coulter clears debris from the planting furrow, and a pair of staggered wavy coulters behind the shank closes any shank voids. A rolling basket or an optional furrow drum trail behind shank to create a suitable seedbed for primary crop planting. The apparatus and an associated method of use aid in cover crop decomposition and pre-plant field preparation.

Other features and objects and advantages of the present invention will become apparent from a reading of the following description as well as a study of the appended drawings.

BRIEF DESCRIPTION OF THE DRAWINGS

A tiller incorporating the features of the invention is depicted in the attached drawings which form a portion of the disclosure and wherein:

FIG. 4A is a lower perspective view of the arrangement of the press drum, band coulter, and trailing shank;

FIG. 5B is a top aerial view of the press drum assembly held by the tiller frame;

FIG. 7 is a perspective view of the tiller assembly during tilling;

FIG. 11A is an inset view of the end-cap support shafts supporting the ends of the press drum; and, FIG. 12 is a step flow diagram of the tilling method used in association with the invention.

DESCRIPTION OF THE PREFERRED EMBODIMENTS

Figure 1:
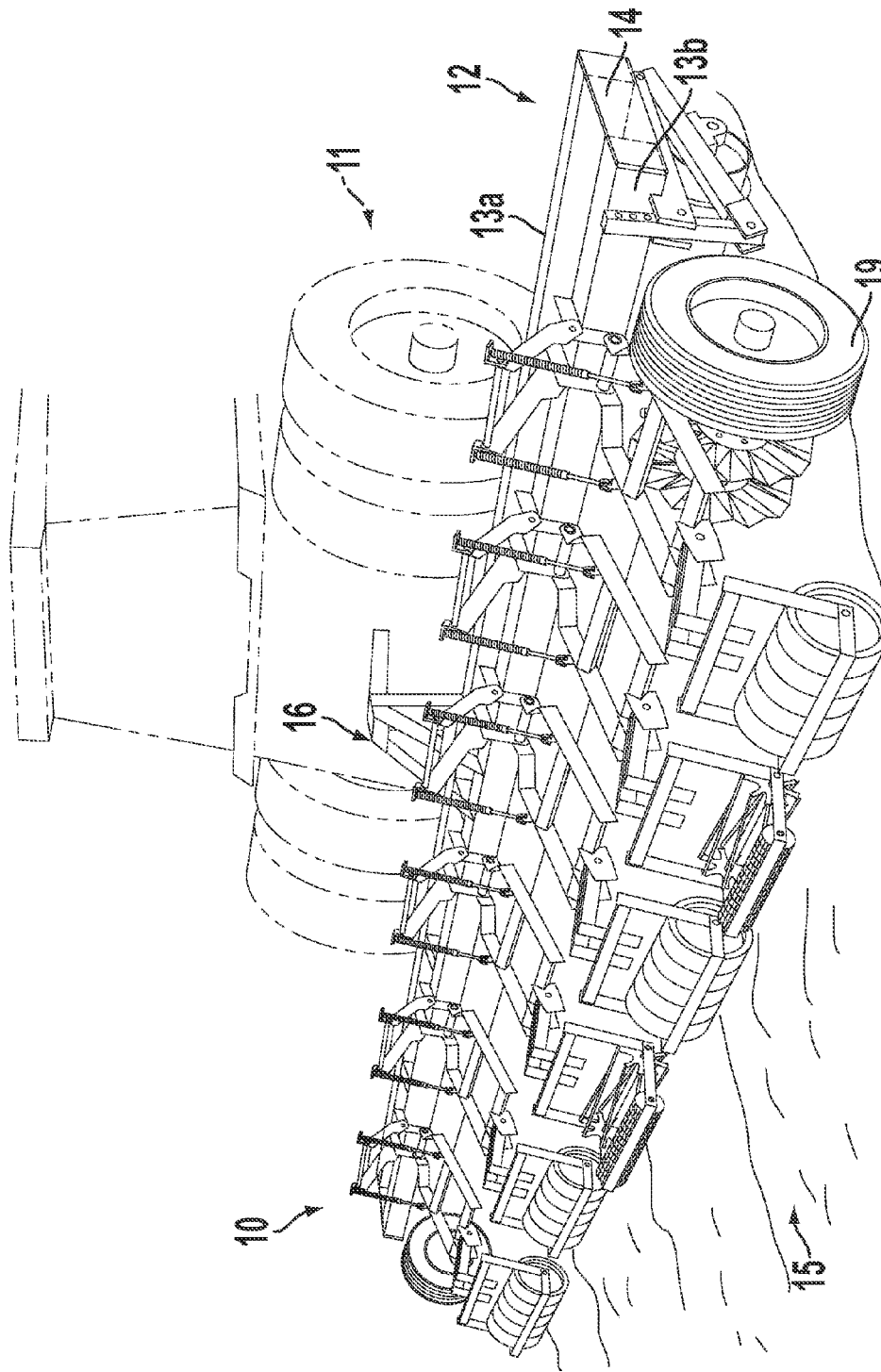
FIG. 1 is a rear perspective view of the tiller.

Referring to the drawings for a better understanding of the function and structure of the invention, FIG. 1 shows a perspective view of the tiller 10 when in use in a farm field. The tiller 10 is designed to be pulled by a tractor 11 to till multiple rows of soil 15 for planting seeds to grow various types of farm crops and vegetation (not illustrated). In particular, the tiller 10 is designed to till either live or killed cover crops in preparation for planting of a primary crop during the growing season. The tiller 10 is primarily a type of "strip tiller" because aside from cover crop compaction narrow strips of planting rows are tilled while leaving the surrounding compacted cover crop intact.

Pursuant to FIG. 1, a standard hitch 16 allows for the connection of the tiller 10 to tractor 11 such that hydraulic control by the tractor 11 over the tiller is maintained. The structure of the hitch 16 permits the operator of the tractor 11 to raise and lower the tiller 10 to accommodate different types of field conditions and for ease of transportation. However, once positioned in suitable alignment with a group of planting rows, the tiller 10 is typically lowered fully onto the field surface and dragged behind the tractor. Settings on the tiller 10, allow for adjustments to tilling depth pursuant to varying types of crops and field soil composition, as will be discussed.

Figure 2:
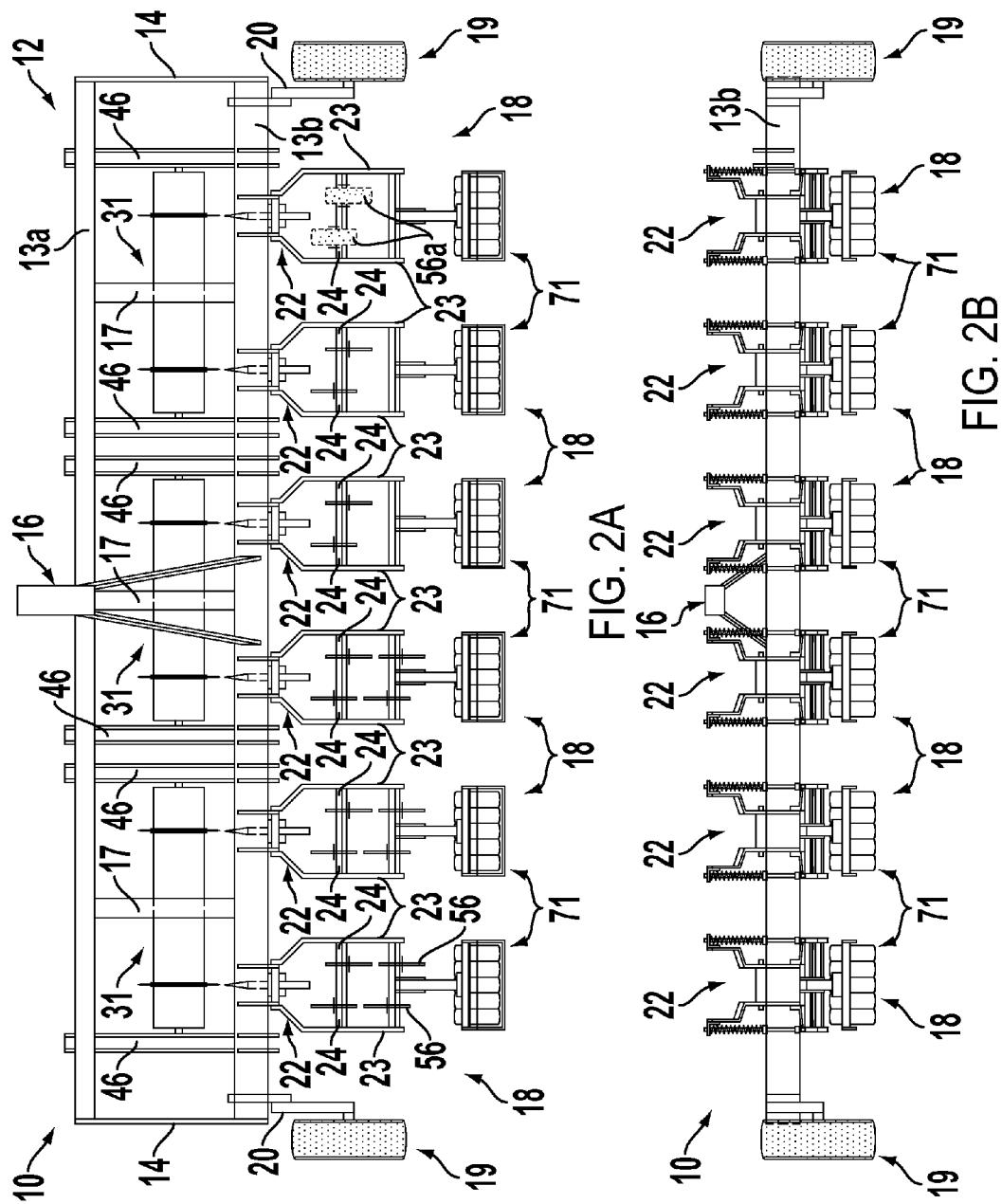
FIG. 2A is a top aerial view of the tiller.
FIG. 2B is a rear elevational view of the tiller.

As may be seen in FIGS. 2A and 2B, hitch 16 is robustly connected to a support frame 12 to hydraulically control the frame. The support frame has two parallel beams 13a, and 13b, with 13b being positioned toward the rear of the tiller 10. As may be understood, beam 13b may also be referred to as a "tool bar" because a plurality of tilling "tools" typically depend rearward from the beam 13b. Beams 13 are connected with a series of welded lateral cross beams 17 and have their ends connected by two welded end plates 14. Tiller assembles 18 are connected to tool bar 13b and trail behind it. Each tiller assembly 18 has, in turn, a soil conditioner 71 that trails behind the assembly 18. Each assemble 18 also includes a pressure spring assembly 22 for biasing the tiller assembly 18 downward.

Figure 3:
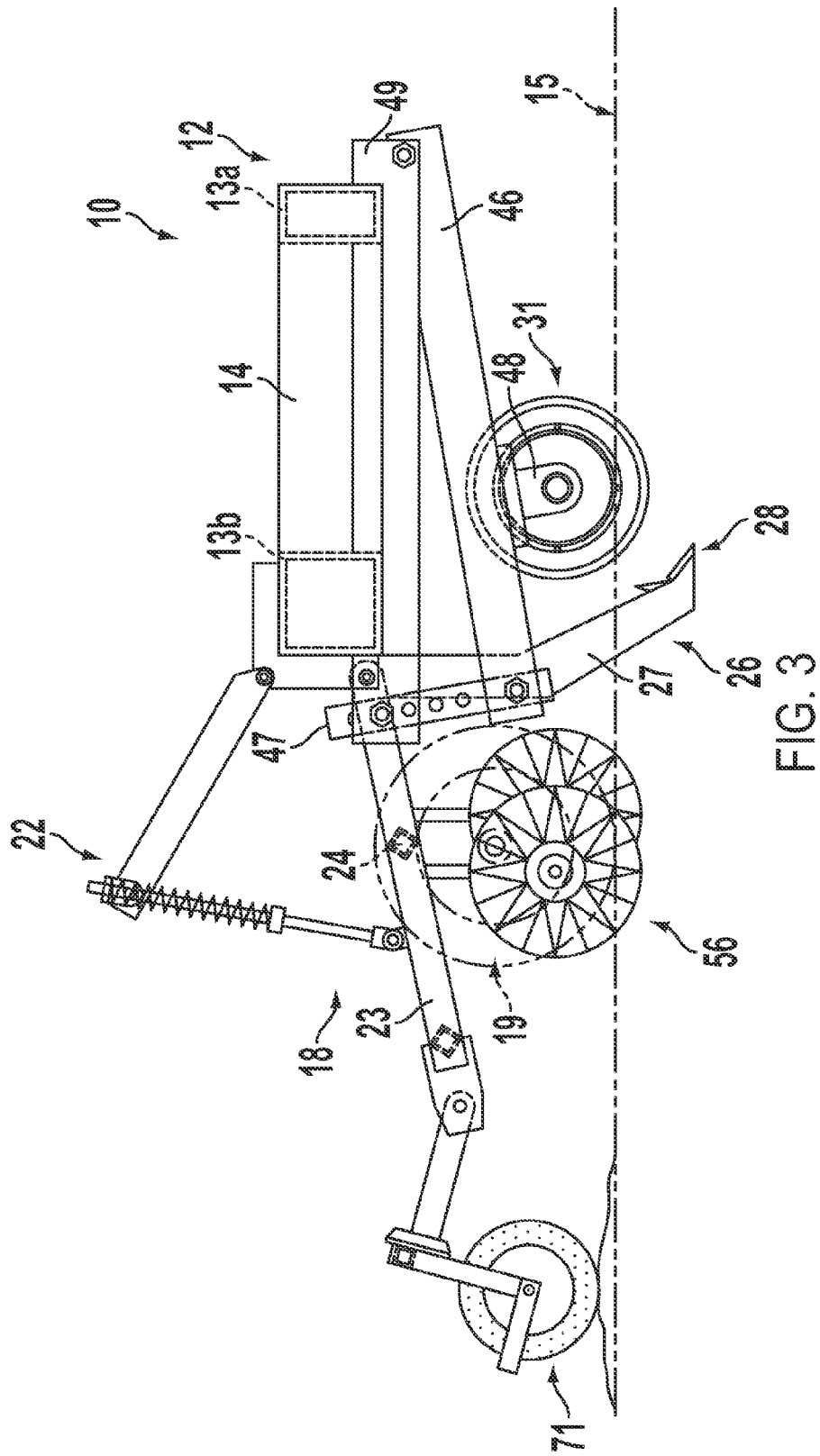
FIG. 3 is a side elevational view of the tiller.

Referring now to FIG. 3, it may be seen that tiller 10 is supported over the soil surface 15 by two support or "gauge" wheels 19, and a series of axially aligned press drums or rollers 31 mounted to frame 12 via angled drum support beams 46. For the purposes of describing the invention, the terms press drum, press roller, or roller shall be used interchangeably to describe a rolling cylindrical implement of predetermined length having a consistent exterior surface, as exemplified by roller 31 shown in the figures. The wheels 19 may be adjusted by adjustable angle journal brackets 20, as is known in the art, to adjust the height of the frame 12 over the soil surface as it moves over a planting field. Six support beams 46 that support the drums 31 are rotatably affixed to mounting bracket 49 and supported at their ends by beams 13a,b. Each end of drum 31 is mounted to the beam 46 by a journal and bearing assembly 48, preferably using a flange type bearing. Press drum 31 is positioned to a distance below frame 12 by gauge plate 47 such that as the tiller moves forward the majority of weight of the tiller 10 is borne by drum 31 upon the soil surface 15. Tilling shank 26 is positioned rearward of drum 31 and just below it in depth. Shank support arm 27 is mounted to the rearward edge of beam 13b in robust arrangement with shank tip 28 extending just below drum 31 as shown. Shank tip 28 may be of any number of known types of shank tips, such as sweeps, winged tips, or ridges, to control the flow of excavated soil and debris.

Tilling assembly 18 also includes one or two pairs of wavy coulters 56 mounted to the tiller assembly frame 23 at cross members 24. As shown in FIG. 2A, coulters 56 are staggered in orientation to one another and may include two or four coulters in a tilling assembly 18. For example, the left three assemblies 18 of FIG. 2A include four wavy coulters and two of the three right assemblies 18 include only two wavy coulters. The depth of each coulter 56 is set by a mounting bracket holding a support post for each coulter. Alternatively, a set of rolling tires 56a may be positioned alongside or on top of the furrow 58 to smooth the soil and compress any vegetation down further. The use of rolling tires 56a in place of coulters 56 may also obviate the need for additional soil conditioners trailing behind the tilling assembly, such as those described in FIGS. 6A-6B.

FIG. 4A shows the positional relationship between the press drum 31, a band coulter assembly 33, and shank 26. Shank 26 trails drum 31 and aligns shank tip 28 with band coulter assembly 33. Shank tip 28 extends below the outer circumference of band coulter assembly 33 by at least several inches so that it protrudes into the soil 15 deeper than the band coulter's cutting edge 37. Journal and bearing 48 assembly support drum shaft 44 and drum assembly 31 on drum support beam 46 at the end of each drum assembly 31 so that the drum can rotate freely.

Figure 4B:
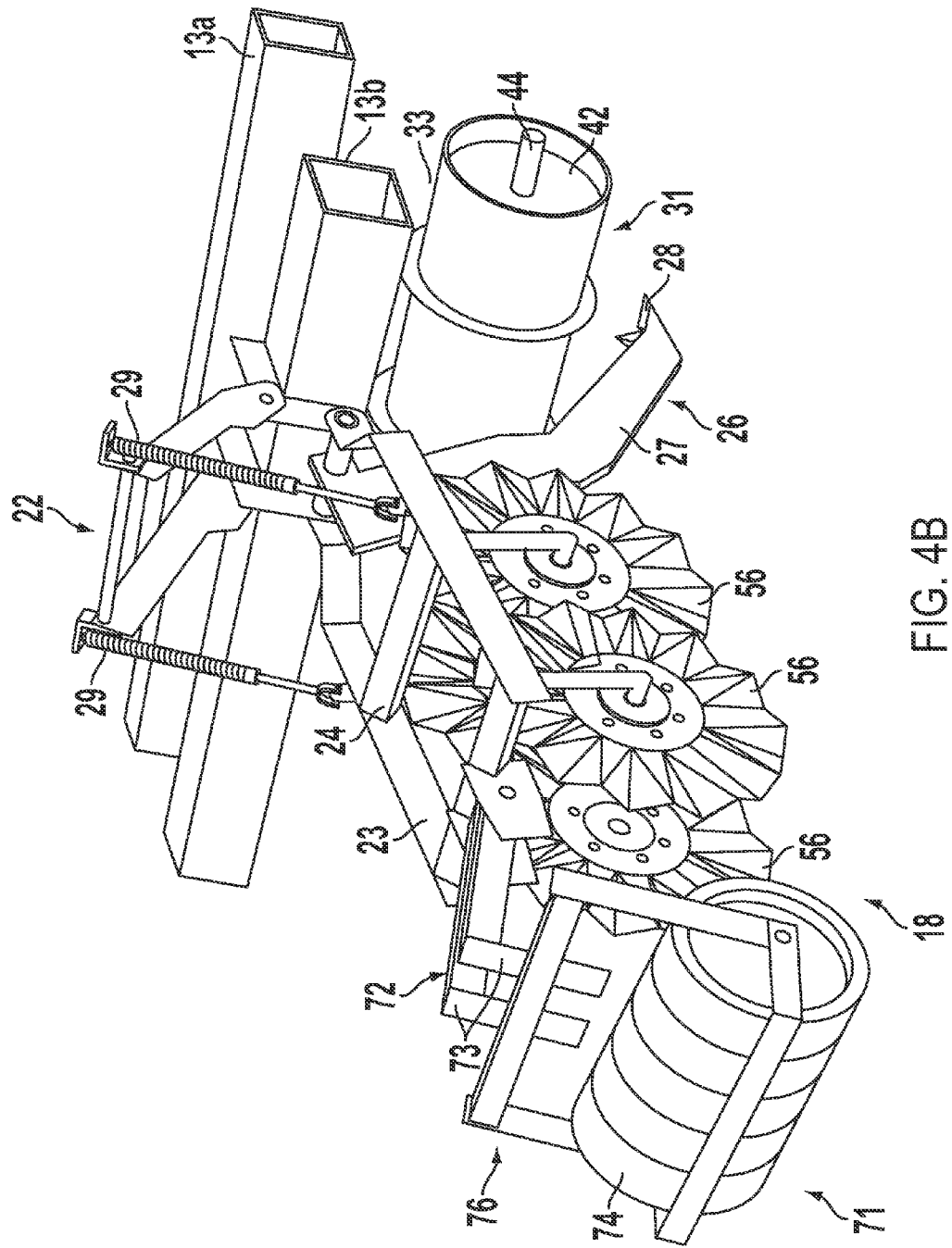
FIG. 4B is a perspective view of the tiller assembly.

FIG. 4B shows the tiller assembly 18 arranged with four wavy coulters 56 mounted to the assembly frame 21 at parallel cross members 24. Wavy coulters smooth soil around a furrow created by shank 26 as it proceeds forward through the soil to close up any voids created by the shank 26. Wavy coulters are positioned in a staggered arrangement just behind shank 26 for optimal furrow conditioning.

Figure 5A:
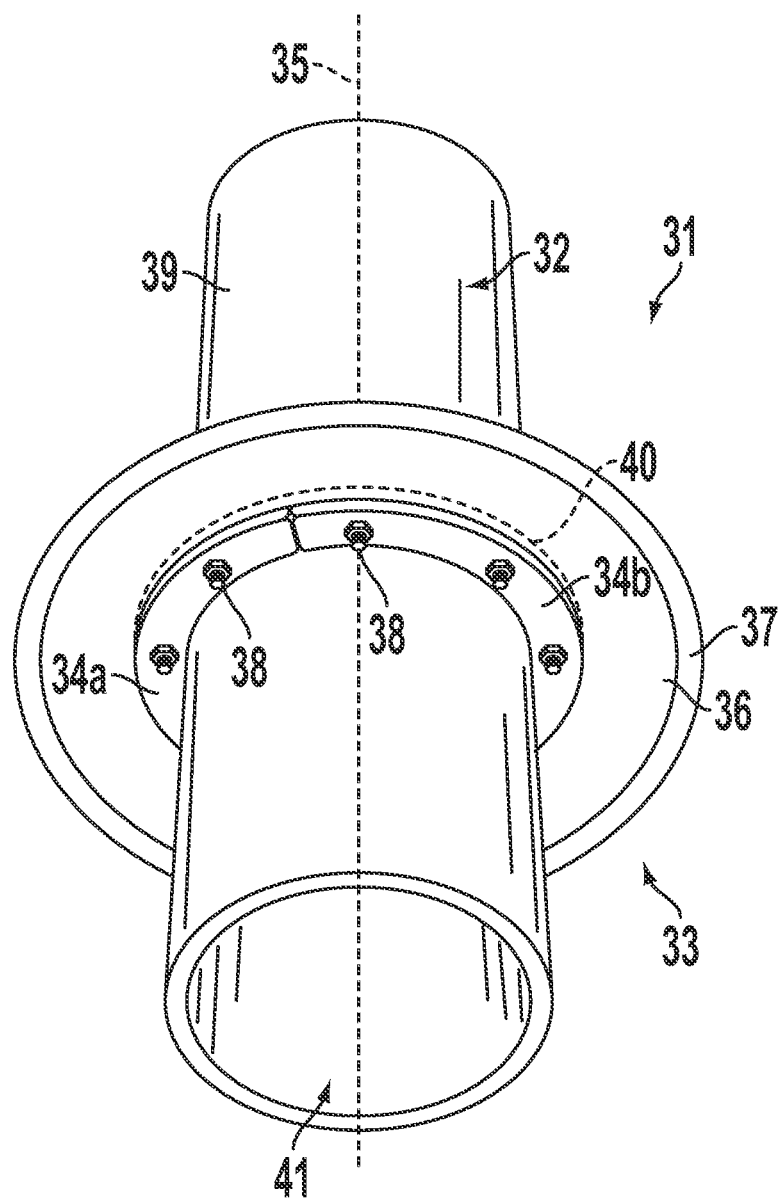
FIG. 5A is a perspective view of a section of the press drum and the band coulter.

FIG. 5A shows press drum assembly 31 along its rotating axis 35 positioned vertically. Press drum 31 includes a steel drum 32 having a hollow interior 41, with its band coulter assembly 33 affixed to the surface 39 of drum 32. Band coulter 36 is mounted onto drum 32 with a pair of mounting plates 34a,b and a series of bolts 38. Coulter 36 is slid over drum 32 at one end or the other, and positioned against a mounting band 40 welded onto the surface 39. The mounting plates 34a,b are then bolted against the coulter and mounting band 40 with the bolts 38 through a series of aligned holes in each, thereby rigidly securing the coulter onto the drum 32, but allowing the coulter to be demounted for maintenance. Coulter 36 may also be formed from two separate pieces covering 180 degrees each of the drum surface, and then bolted onto the mounting band 40 to further facilitate removal and replacement. Preferably, drum 31 has a length of 72 inches, an interior diameter of 12 inches, and consists of standard 12 inch weld casing pipe having ⅝ of an inch wall thickness. The diameter of the band coulter 33 can vary depending upon the type of crop application, but a typical diameter is 20-24 inches, with 21 inches being optimal. Coulter blade width (i.e. cutting depth) can vary from between 4 and 6 inches, with 5½ inches being optimal.

As shown in FIG. 5B, press drum 31 is mounted between support beams 46 on journal assemblies 48. Band coulter assemblies 33 are aligned with shank tip 28 to facilitate furrow clearing by shank 26 after coulter 33 cuts surface and sub-surface soil 15, as will be discussed. The configuration showing in FIG. 5B shows a relatively short roller 31 having only two coulters 33 installed on the drum surface 39, with three rollers axial aligned between support beam 13a and 13b. The embodiment showing 10 is preferred by the inventors, but various other numerical configurations of rollers and coulters are possible. For example, instead of the disclosed configuration of three rollers each holding two coulters (i.e. 6 planting rows), a single roller holding six coulters is possible, as will be shown below (i.e. 6 planting rows), or two rollers with four coulters (i.e. 8 planting rows), or one roller with four coulters (i.e. 4 planting rows), or a single roller with four coulters and having two fold-up rollers, one on each side with 3 coulters each (i.e. 12 planting rows). Hence, the inventors contemplate that various numerical roller and coulter mounting permutations would be available to the operator of the herein described invention.

Figure 6A:
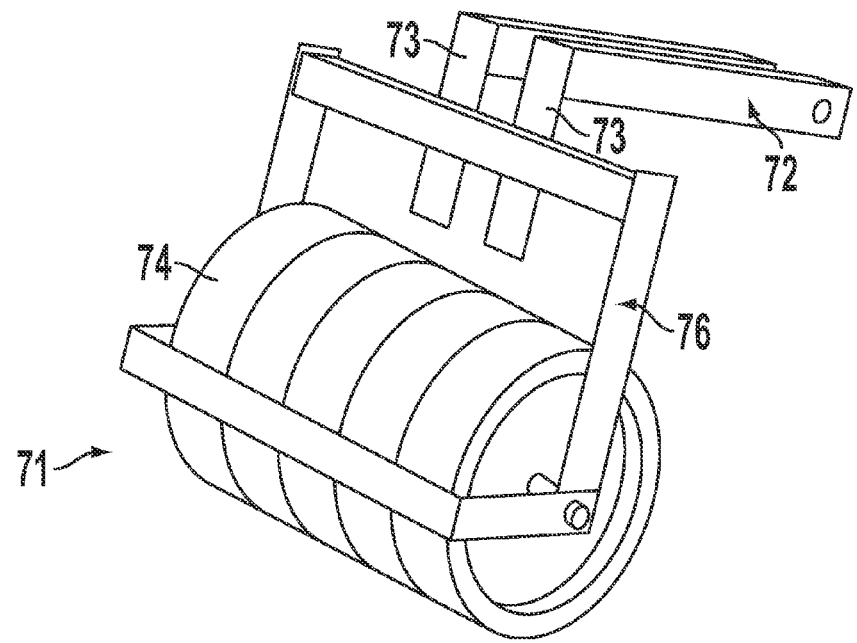
FIG. 6A is a perspective view of one type of furrow conditioner.
Figure 6B:
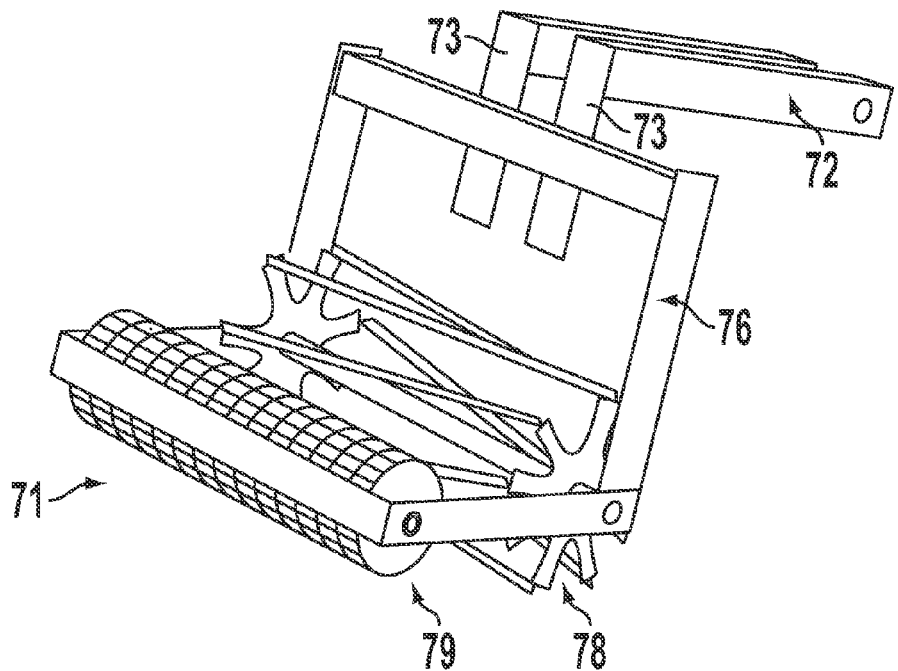
FIG. 6B is a perspective view of another type of furrow conditioner.

FIGS. 6A and 6B show two types of seedbed soil conditioners 71 that may be trailed behind tiller assembly 18. FIG. 6A shows a seedbed roller having a support arm 72 that is rotatably connected to the rear of tiller assembly frame 21. The roller 74 is typically flat-surfaced to smooth the soil as it passes underneath the roller 74. FIG. 6B shows a pair of conditioners affixed to frame 21 in the same manner, but trails instead of a pair of rotating implements. Frame 76 holds in its forward part a soil crumbler 78 for dissipating large soil conglomerates, and a rolling basket 79 to further reduce the size of the soil particles, thereby providing a porous seedbed to facilitate water penetration and plant root proliferation.

Referring now to FIG. 7, it may be seen how the tiller 10 operates in a crop field. As tractor 11 pulls tiller 10 forward 45, roller 31 moves forward as the leading edge of the tiller 10 to engage crops or crop residue. The tiller 10 is oriented by the tractor operator with hitch 16 so that majority of the weight of tiller 10 resides on the roller 31. As the roller 31 moves forward, it presses cover crops (or crop residue) against roller surface 39 causing the crops to be crushed and compressed against soil surface 15. Simultaneously, band coulter 36 slices through compressed foliage on the soil surface 15 along furrow center line 58, and slices through any sub-surface roots or residue. Shank support arm 27 and tip 28 clear a furrow along the furrow line 58, thereby removing any type of crop debris and pushing up debris and soil on either side of the center line 58. At least a pair of wavy coulters 56 then spreads any furrow ridges or mounds created by the shank 26 adjacent to furrow center line 58 to fill in any furrow voids created by tiller shank 26. A second pair of wavy coulters 58 (not shown) may provide further smoothing of ridges or mounds. As may be seen, shank 26 is aligned with band coulter blade 36 along line 58 and, preferably, aligned with an intended furrow in the crop field. A pressure spring assembly 22 maintains constant down-force on tiller assembly 18 to maintain continuous contact of tiller 10 on soil surface 15 and a consistence tilling depth of the shank 26 relative to the roller 31.

Figure 8:
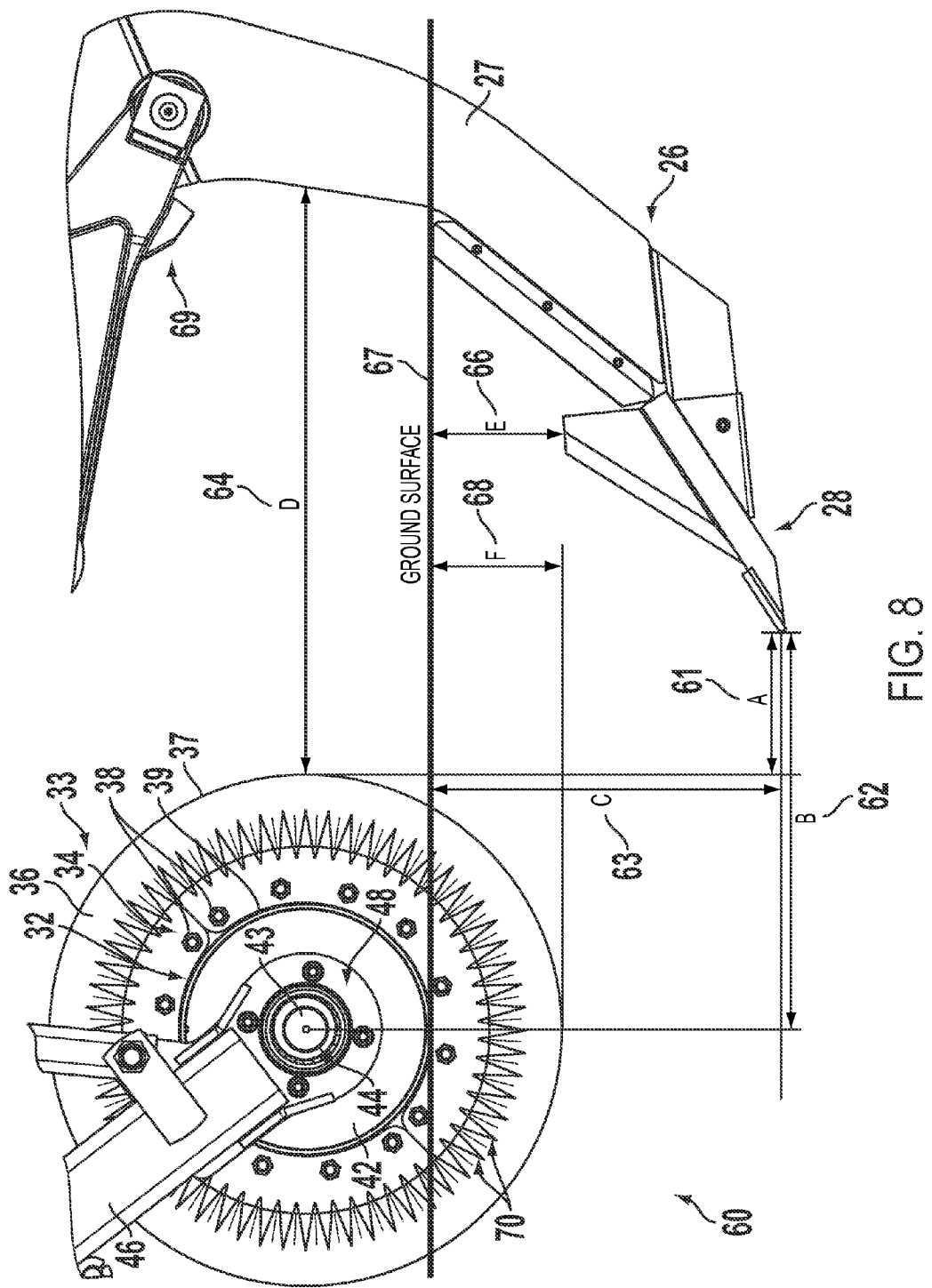
FIG. 8 is a diagrammatic view showing the spatial relationship between the press drum, band coulter, and trailing shank.

FIG. 8 represents another embodiment of the tiller 10 and provides a clearer picture of the relationship between the band coulter assembly 33, roller 31, and tiller shank 26. Shank tip 28 trails behind coulter blade cutting edge 37 a distance of A 61 as coulter blade 36 cuts through ground surface 67 to a depth of F 68. Drum surface 39 presses against ground surface 67 as it rotates forward, thereby supporting the majority of weight of tiller 10 on the ground surface 67. Shank tip 28 is positioned to a depth of C 63 below the ground surface, and trails behind the press drum center rotation axis 35 a distance of B, and shank arm 27 trails behind blade edge 37 just above the ground surface a distance of D 64. If present, wings or tip ridges may raise above tip 28 to a distance below the ground surface of E 66.

The relative dimension of A 61 through F 68 will vary depending upon farming location, soil conditions, and weather. For example, sandy soil conditions might require the tiller operator to raise up the shank 26 thereby decreasing the depth C 63 and move the shank 26 forward relative to the roller 32 thereby decreasing the distance A 61 behind the cutting edge 37. A typical set of spatial dimensions for A 61 through F 68 in the Southeastern United States, which has relatively sandy soil, would be a shank depth C 63 of 16 inches, a trailing shank tip distance A 61 of 6 inches, a shank wing depth E 66 of 6 inches, and a shank arm 27 distance D 64 of 26 inches. The roller 32 has a diameter of 10¾ inches and the band coulter disc diameter is 22 inches. Hence, the band coulter 36 has a cutting blade depth F 68 through the ground surface 67 of approximately 5⅝ inches.

It will be noticed that in the embodiment of coulter assembly 33 and roller assembly in FIG. 8 that band coulter 36 has a series of support ridges 70 formed in its surface between the mounting plates 34 and the blade edge 37. These ridges are longitudinally oriented toward the center rolling axis of the coulter such that they provide additional support to the coulter 36 as it cuts through crop surface residue and root residue, but without inhibiting the cutting effect of the coulter blade 36.

Figure 9:
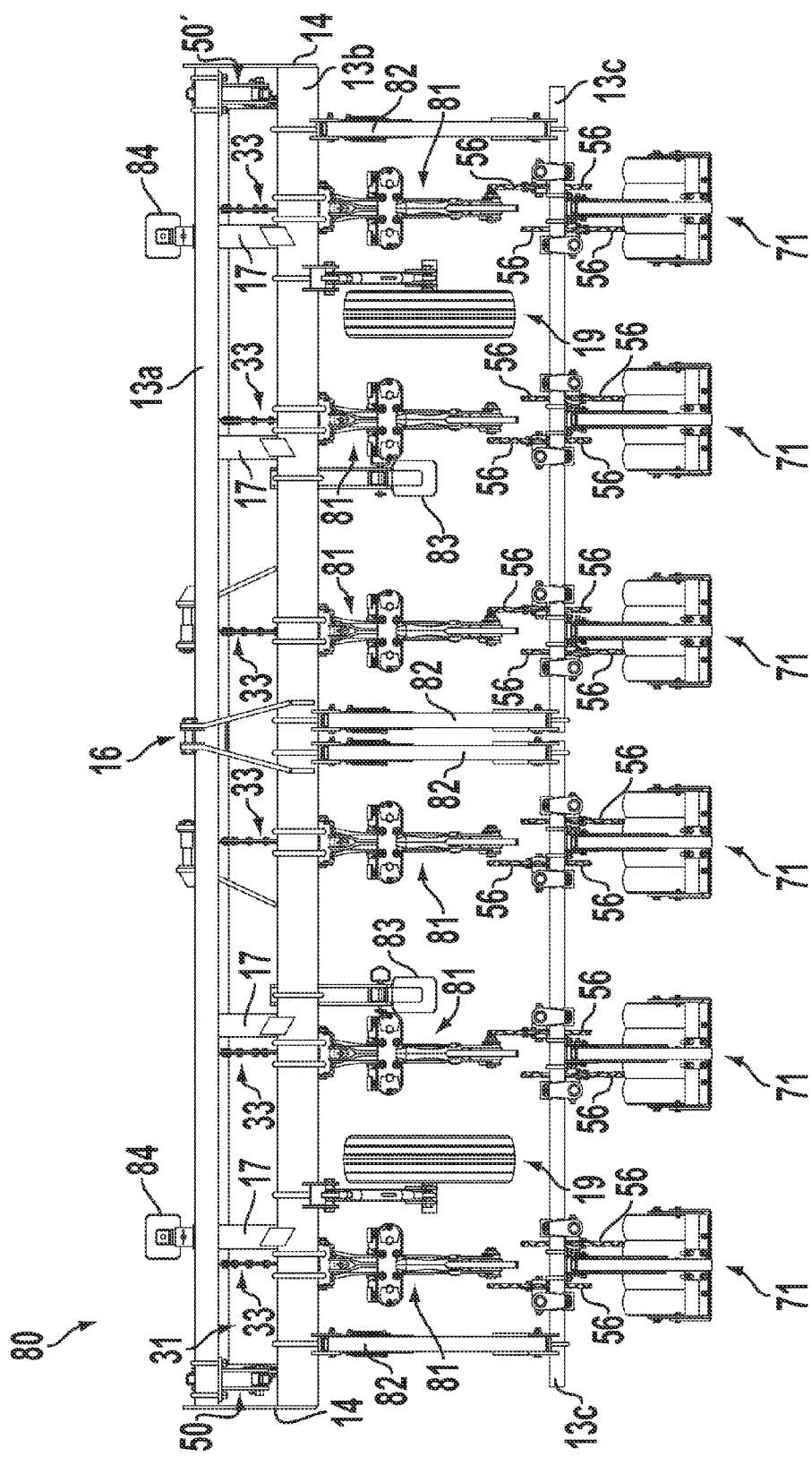
FIG. 9 is a top aerial view of another embodiment of the tiller.
Figure 10:
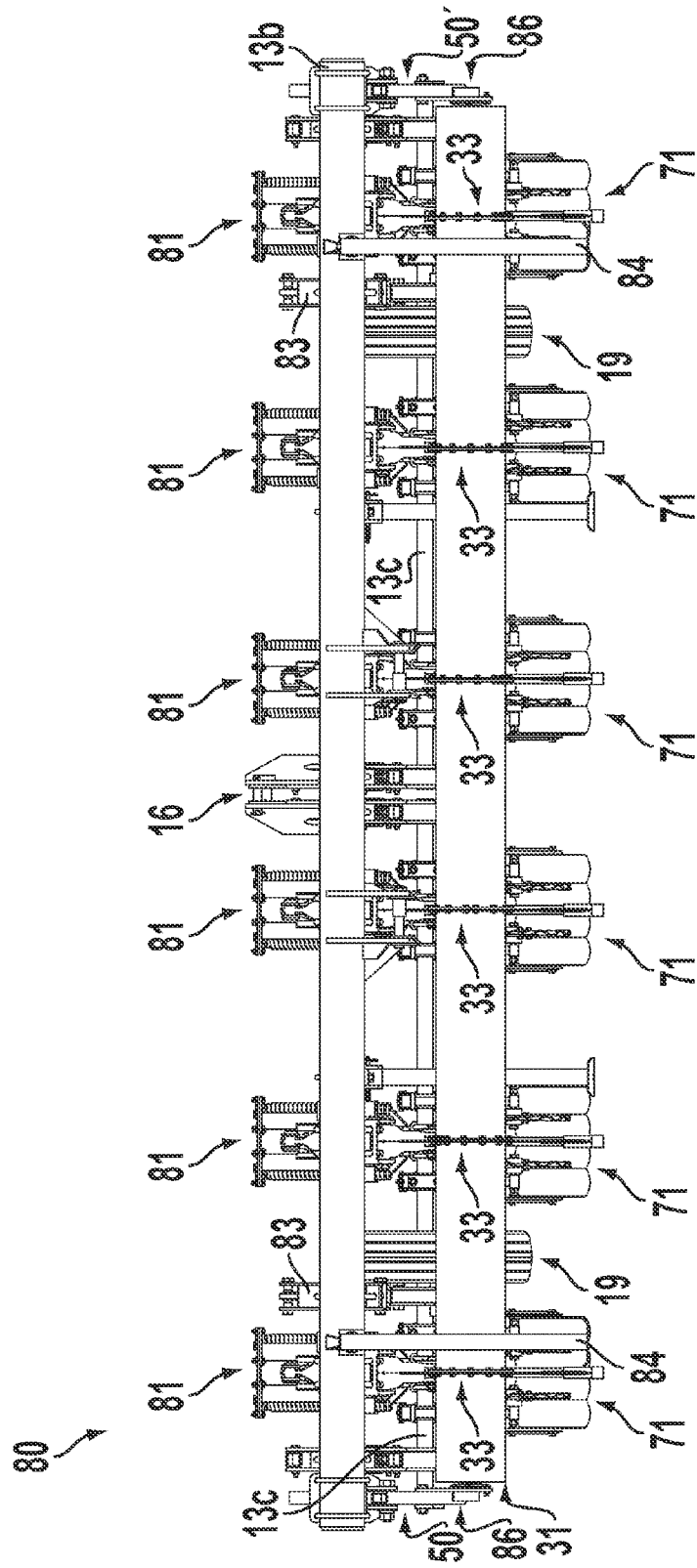
FIG. 10 is a front elevational view of another embodiment of the tiller.
Figure 11:
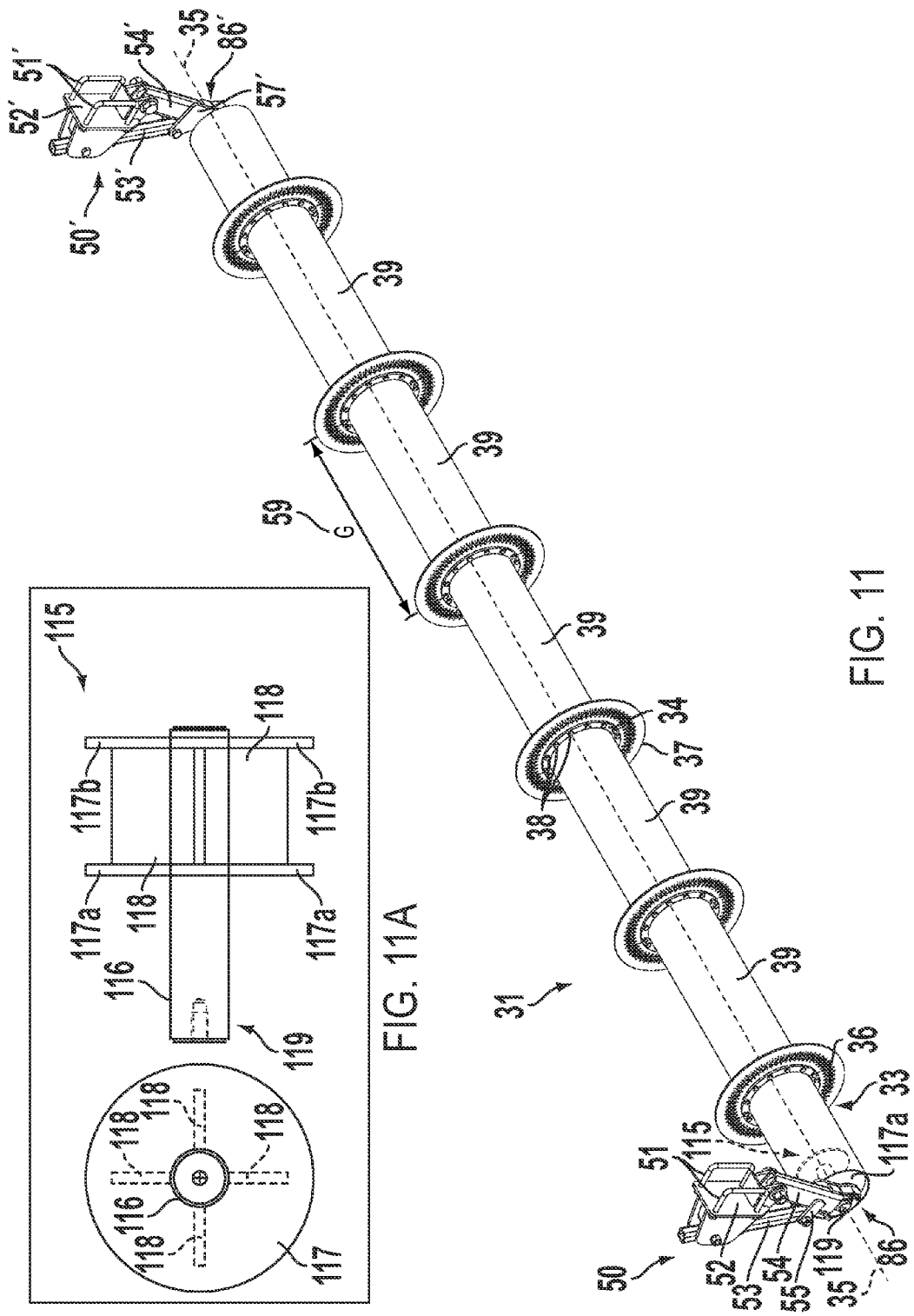
FIG. 11 is a perspective view of the press drum with multiple installed band coulters.

Referring now to FIGS. 9-11, it may be seen that the embodiment shown in FIG. 8 presents some changes to first embodiment of tiller 10. Embodiment 80 rearranges some elements of tiller 10 so that tiller shank 26 may be spring biased against the ground so that in the event that the shank 26 encounters a strong root or a subsurface rock, it may raise upward to surmount the obstacle without damage to the shank tip 28 nor to the arm 27 and reset to the original depth. Embodiment 80 also presents a configuration in which a single roller is used to till multiple crop rows.

Gauge wheels 19 are relocated inside at least one tiller assembly 81 as shown to provide more interior support to tool bar 13b. Four vertical pairs of support members 82 rigidly connect tool bar 13b to two smaller aligned, trailing tool bars 13c, to which a series of soil conditioner assemblies 71 are affixed. It will also be noticed that pairs of wavy coulters 56 are attached the tool bar 13c, thereby leaving tiller shank assembly 81 as the primary support for the shank 26. A single roller 31 spans the length of tool bar 13b, having 6 coulter assemblies 33 mounted on the roller. The embodiment includes front and rear stands 84,83, to support the tiller 80 when detached from tractor 11.

Referring to FIG. 10, single roller 31 is rotatably supported by two drum support assemblies 50, 50' each having a pillow bearing assembly 86. The support assemblies 50, 50' serve a similar support function to the angled support arm 46 and gauge bar 47 in the configuration of the preferred embodiment 10. Depending upon the hydraulic power available to tractor 11 to lift hitch 16, some tractors might require a hydraulic lift-assist to be attached to bar 13b in order to lift rear tool bar 13b with its attached tiller assemblies. The tiller shank assemblies 81 each have a pair of springs as shown to bias the shank downward to a selected depth into the soil, while allowing for shank to travel upward to pass over obstacles in the soil.

FIG. 11 shows the roller and support structure for it in the embodiment 80. Roller support assembly 50 includes a downwardly angled support bar 53 rotatably coupled to rear angled support member 54 via side bracket 55, with the combination securely clamped to tool bar 13b via clamps 51. The bottom of rear angled support member 54 includes a pillow bearing assembly 86 that fits over a shaft 119 that extends from the inside of roller 31.

As shown in inset FIG. 11A, a support shaft weldment 115 includes a shaft 119 and two discs 117a,b rigidly spaced from one another by four (4) gussets 118 such that disc 117a is positioned at about the mid-point of shaft 119. The weldment 115 is sized such that it may be inserted into the end of the roller 31 to tightly fit the inner circumference of roller 31, with disc 11a welded to the inner circumference of the roller adjacent to its end, leaving a portion at the end 116 of shaft 119 extending along axis 35 outside of the roller. As may be understood, the central rotation axis 35 and the rotation axis of shaft 119 must be closely aligned so that roller 31 rotates equidistantly around axis 35 as shaft 119 rotates. After welding, disc 117a serves to seal the end of roller and provide a rigid support to the roller. The end of shaft 119 may then be inserted into pillow bearing assembly 86 and repeated with assembly 50' so that roller 31 is able to freely rotate below front beam 13a and rear tool bar beam 13b.

As shown, six band coulters 33 are installed along the surface of roller 31 in the manner described above, with a spacing G 59 between each coulter arranged to match a predetermined crop row width, depending upon the crop and soil conditions of the farming field area. As may be understood, shorter tiller assemblies having rollers and coulters of varying lengths may be arranged as "wings" to the left and right of the configuration shown in FIGS. 9-11 to accommodate larger parallel row tilling, such as for example two (3) three row wings on each side of the (6) six coulter configuration 80 so that 12 rows may be tilled in a single pass.

Figure 12:
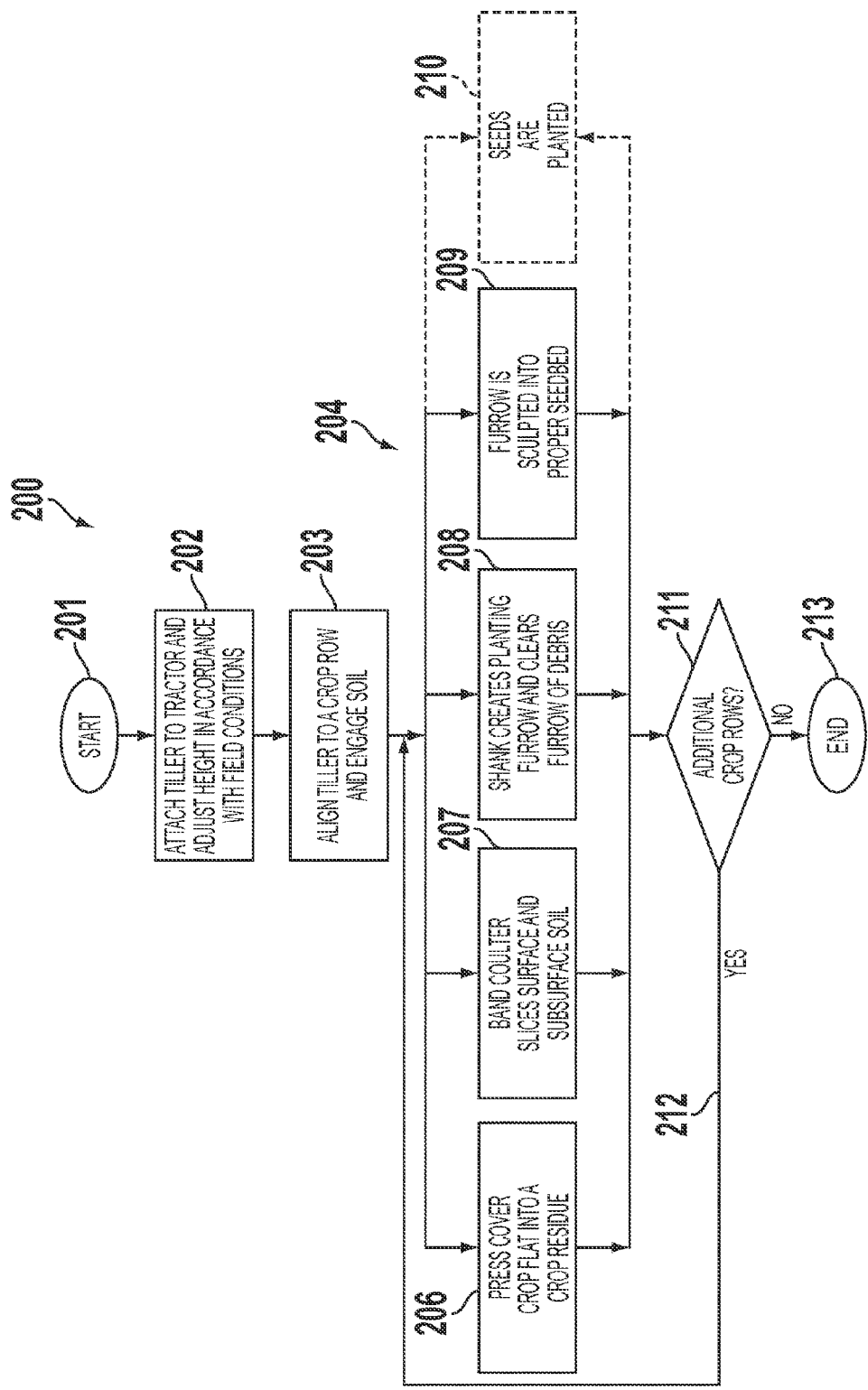

Utilizing either tiller 10 or tiller embodiment 80, a consistent tillage may be achieved on live cover crop or cover crop residue to achieve the benefits of planting a cover crop with a minimum of tillage labor, as may be seen in FIG. 12. At the start 201, the tractor operator adjusts the height of the tiller 10 (or 80) to accommodate planting field conditions 202, and positions the tractor and tiller 10 (or 80) such that each band coulter 33 (and shank 26) is aligned 203 with an intended planting furrow center line 58. The operator then lowers the tiller 10 to engage the soil surface 203 while moving forward at a 2-8 mph pace. The pace is determined by the density of the cover crop or crop residue that is present in the planting field, as is known in the art. As the tiller 10 progresses through the field, four or five simultaneous events 204 occur resulting from the structure of the tiller 10, each occurring at a different position in the intended furrow, but each occurring simultaneously in time. First, press roller 31 compresses the cover crop into a highly compressed mat 206 while slicing a 4-6 inch deep division in the surface and sub-surface soil 15 along the furrow center line 58 207. The penetration of the shank and band coulter into the soil is controlled by the position of the gauge bar 47 and by adjustment of support wheels 19 via journal bracket 20, and can vary by cover crop type, growth density, and soil type. The shank 26 then clears a furrow directly behind the band coulter 33 and removes debris from the furrow along the center line 58 208. Multiple wavy coulters 56, then collapse ridges or mounds created by the shank 26 so that a relatively smooth planting bed is achieved 209. Trailing soil conditioners 71 may further condition the seedbed to create an optimal soil medium. Either replacing trailing soil conditioners 71 or trailing behind the soil conditioners, a planter may optionally deposit seeds into the created seedbed 210 so that an additional planting pass is obviated. After a single group of parallel planting rows is prepared, additional rows may be tilled 212 if any remain 211 until the field preparation is finished and ready for the included step of seed planting or for a separately timed planting operation.

While I have shown my invention in one form, it will be obvious to those skilled in the art that it is not so limited but is susceptible of various changes and modifications without departing from the spirit thereof.

Having set forth the nature of the invention, what is claimed is:

1. A farming tiller, comprising:
   a. a frame, said frame including means for attachment to a tractor;
   b. a press roller rotatably mounted to and supported by said frame, said roller including a smooth uniform surface and adapted for smooth rolling engagement over vegetation upon forward movement of said frame over a field of vegetation such that said vegetation is compressed into a mat;
   c. a pair of band coulters circumferentially affixed to the surface of said roller, each said band coulter having a cutting edge of sufficient width to form a slicing division through the soil surface and sub-surface, wherein said press roller surface is adapted to form a continuous smooth surface between each said coulter, and wherein each said band coulter is positioned on said press roller so that penetration of said band coulter into said soil surface is limited by the surface of said press roller pressing against said soil surface;
   d. a tilling shank mounted to said frame and positioned in-line with and behind each said band coulter such that said shank forms a planting furrow along the slicing division created by said band coulter; and,
   e. means positioned behind said shank for filling voids created by said shank as it moves though the soil.

2. The tiller as recited in claim 1, wherein said shank comprises a support arm affixed to said frame at a rearward position relative to said roller and having an angled lower end depending downward and toward said band coulter, a shank tip affixed to said lower end adapted for forming said furrow, and wherein said shank tip is positioned below said coulter cutting edge relative to the soil surface.

3. The tiller as recited in claim 2, wherein said roller further comprises a mounting band affixed to the exterior of said roller and sized to support one side of each said band counter, and at least one mounting plate adapted to be placed against said band coulter in clamping engagement with said mounting band such that said band coulter is firmly retained against and support by said roller.

4. The tiller as recited in claim 3, wherein said press roller includes a plurality of pairs of band coulters positioned along its surface and spaced from each other to accommodate a numerically identical number of planting rows in said field with a single tractor pass.

5. The tiller as recited in claim 1, wherein said press roller includes three pairs of band coulters spaced on said roller to accommodate 6 planting rows in said field.

6. The tiller as recited in claim 5, wherein said shank comprises a support arm affixed to said frame, an angled portion depending downward, and a shank tip affixed to said angled portion at its lower end, wherein said shank tip is positioned behind said coulter blade in relation to the soil surface a distance at least equal to the radial blade width of said band coulter.

7. The tiller as recited in claim 6, wherein said roller further comprises a steel cylinder having a longitudinal axis and hollow interior, and wherein said roller includes a weldment positioned in each end, said weldment comprising a shaft having two axially aligned discs formed thereon, said discs spaced from one another by a plurality of supporting gussets, wherein said weldment is positioned within the end of said roller and said discs are sized to circumferentially abut the interior surface of said roller in snug relation thereof, and wherein one of said discs is welded to the end of said roller to form an end cap, and wherein said shaft extends outward along said longitudinal axis and through said end cap.

8. The tiller as recited in claim 1, further comprising pair of bars aligned along their longitudinal axes and positioned behind and connected to said frame, wherein said shank is positioned in front of said pair of bars and said void filling means is supported by one of said pair of bars.

9. The tiller as recited in claim 8, further including seedbed soil conditioning means for improving the planting condition of said furrow soil.

10. The tiller as recited in claim 9, wherein said seedbed soil conditioning means comprises at least one seedbed soil conditioner assembly selected from the group consisting of a soil crumbler, a rolling basket, rolling tires, and a seedbed roller.

11. The tiller as recited in claim 10, wherein said farm tiller comprises three said rollers, and wherein said rollers and said band coulter pairs are spaced on said tiller to accommodate 6 planting rows simultaneously as said tiller moves forward in said field.

12. The tiller as recited in claim 1, further comprising at least one gauge wheel connected to said frame for adjusting the height of said frame relative to the soil surface.

13. The tiller as recited in claim 12, wherein said farm tiller comprises three said rollers, and wherein said rollers and said band coulter pairs are spaced on said tiller to accommodate 6 planting rows simultaneously as said tiller moves forward in said field.

14. A tiller, comprising:
   a. a frame, said frame including means for attachment to a tractor;
   b. a press roller rotatable mounted to and supported by said frame, said roller including a smooth uniform surface and adapted for smooth rolling engagement over vegetation upon forward movement of said frame over a field of vegetation such that said vegetation is compressed into a mat;
   c. a plurality of cutting means circumferentially affixed to said surface of said press roller for slicing through the soil surface to a predetermined depth, wherein said press roller surface is adapted to form a continuous smooth surface between each said cutting means, and wherein said cutting means is positioned on said press roller so that penetration of said cutting means into said soil surface is limited by the surface of said press roller pressing against said soil surface;
   d. means mounted to said frame and positioned in-line with each said cutting means for forming a planting furrow along the slicing division created by said cutting means;
   e. means positioned behind said furrow means for filling voids created by said furrow means as it moves though the soil; and,
   f. wherein said tiller is positioned in a crop field such that each said cutting means and void filling means move through the seedbed portion of said crop field.

15. The tiller as recited in claim 14, wherein said press roller includes at least six cutting means spaced on said roller means to accommodate 6 planting rows in said field.

16. A tiller for preparing a field having a cover crop planted therein, comprising:
   a. a frame adapted for trailing behind a tractor;

b. at least one roller rotatably supported by said frame, said roller including a smooth rolling surface adapted for pressing cover crop foliage and foliage residue flat against the ground, c. a plurality of band coulters positioned along the exterior of each said roller and spaced from each other to accommodate a numerically identical number of planting rows in said field with a single tractor such that rotational advancement of said roller over the ground surface causes each said band coulter to slice through said ground surface to a depth equal to the maximum radial distance each said band coulter extends away from said smooth rolling surface on said roller;

d. a tiller assembly rotatably mounted to said frame, said tiller assembly including a tilling shank, wherein said tiller assembly is positioned such that said shank is positioned behind and aligned with each said band coulter to create a planting furrow; and, e. a soil conditioner connected to said tiller assembly and positioned behind for preparing said soil for receiving planting seed.

17. The tiller as recited in claim 16, wherein said soil conditioner comprises one or more tires positioned for smoothing of said planting furrow.

18. The tiller as recited in claim 16, wherein said soil conditioner comprises a pair of tires in staggered relation to said shank, wherein one such tire is position on one side of said furrow and said other tire is positioned to the other side of said furrow.

19. The tiller as recited in claim 18, wherein said shank comprises a support arm affixed to said frame at a rearward position relative to said roller and having an angled lower end depending downward and toward said band coulter, a shank tip affixed to said lower end adapted for forming said furrow, and wherein said shank tip is positioned below said coulter cutting edge relative to the soil surface.

20. The tiller as recited in claim 19, further including tensioning means for biasing said tilling assembly downward.

21. A method for preparing a field planted with a cover crop for seeding, comprising the steps of:

a. pressing the cover crop flat onto the ground surface with a smooth surfaced roller;

b. simultaneously with said pressing step, cutting a pair of planting furrow lines through said pressed cover crop and into the ground with a pair of band coulters circumferentially mounted on said roller, wherein said roller presents a uniform smooth rolling surface against the ground between said band coulters upon movement thereof;

c. simultaneously with said cutting step, tilling a planting furrow aligned with each said furrow line in a seedbed with a shank dragged behind each said band coulter;

d. conditioning the furrow soil behind each said shank by smoothing ridges created in said tilling step.

22. The method as recited in claim 21, wherein said step of cutting a pair of planting furrow lines further comprises each said coulter cutting to a depth equal to the radial distance between said smooth surface of said roller and the outer edge of each said band coulter.

23. The method as recited in claim 22, wherein said step of cutting a pair of planting furrow lines through said pressed cover crop further comprises positioning each said band coulter to engage a planting furrow in said crop field, and wherein said roller step further comprise presenting a uniform smooth surface over said crop field along the entire length of said roller.

24. The method as recited in claim 21, wherein said cutting step comprises cutting at least six planting furrow lines in seedbeds with a plurality of band coulters positioned on said roller, wherein each said band coulter is positioned on said roller to match the plant row spacing in said field during said cutting step.

25. The method as recited in claim 24, further including after said conditioning step the step of planting seeds in each said furrow.

26. The method as recited in claim 25, wherein said tilling step further comprises tilling said furrow to a depth of at least 4-6 inches below the cutting edge of each said band coulter.

27. The method as recited in claim 24, wherein said tilling step includes a biased reset action such that said shank lifts up upon encountering an un-tillable object in said soil to surmount said object and returns to a preset depth after passing said object in response to a tensioning mechanism affecting said shank.

28. The method as recited in claim 27, wherein pressing step forms a vegetation matt adapted for retaining moisture in said crop field by compacting said vegetation as said roller moves forward over said crop field.

29. A method of retaining moisture in a crop field between planting seasons, comprising the steps of:

a. tilling a cover crop field having live cover crop vegetation;

b. wherein said tilling step comprises;

i. pulling a press roller mounted to a pulling frame and having a smooth uniform surface over said cover crop such that said cover crop is pressed flat to form a compacted mat of vegetation;

ii. simultaneously with said pulling step, slicing through said vegetation and into the ground with two band coulters circumferentially affixed to the surface of said press roller to form two parallel furrow lines, wherein said press roller surface is adapted to form a continuous smooth surface between each said coulter such that said vegetation between said coulters is uniformly pressed flat there between as said roller moves forward, wherein each said band coulter is positioned on said press roller such that each said formed furrow line occurs in a seedbed of said crop field, and wherein the depth of said slicing action is limited by the surface of said press roller pressing against the surface of said ground;

iii. simultaneously with said pulling step, pulling a tilling shank mounted to said frame and positioned in-line with and behind each said band coulter such that said shank forms a planting furrow along said furrow line; and, c. wherein said tilling step forms said cover crop into a compressed layer of vegetation over the entirety of said crop field surface except for said formed planting furrows.

30. The method as recited in claim 29, wherein said pulling step further comprises pulling three said press rollers connected to said frame simultaneously through said crop field.

* * * * *